(No Model.)

J. R. AYERS.
COMBINED HOE AND PLANTER.

No. 488,596. Patented Dec. 27, 1892.

ATTEST.
J. Henry Kaiser
May E. Moore

James R. Ayers.
INVENTOR.
by Wm. N. Moore
Attorney.

UNITED STATES PATENT OFFICE.

JAMES R. AYERS, OF PETERSBURG, VIRGINIA.

COMBINED HOE AND PLANTER.

SPECIFICATION forming part of Letters Patent No. 488,596, dated December 27, 1892.

Application filed June 13, 1892. Serial No. 436,502. (No model.)

*To all whom it may concern:*

Be it known that I, JAMES R. AYERS, a citizen of the United States, residing at Petersburg, in the county of Dinwiddie and State of Virginia, have invented certain new and useful Improvements in a Combined Hoe and Planter; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in combined hoes and planters, especially adapted for planting corn although it may be used for other purposes if desired.

One object of my invention is the provision of a device of the character named which will perform the operations of hoeing and planting in a perfect manner and which will be light in weight so as not to tire the operator.

Another object of my invention is the provision of a combined hoe and planter which will be of the simplest possible construction so as to withstand the hard usage to which it is subjected and which can be manufactured at a low price so as to place within the reach of all a thoroughly practical and useful device.

Figure 1:
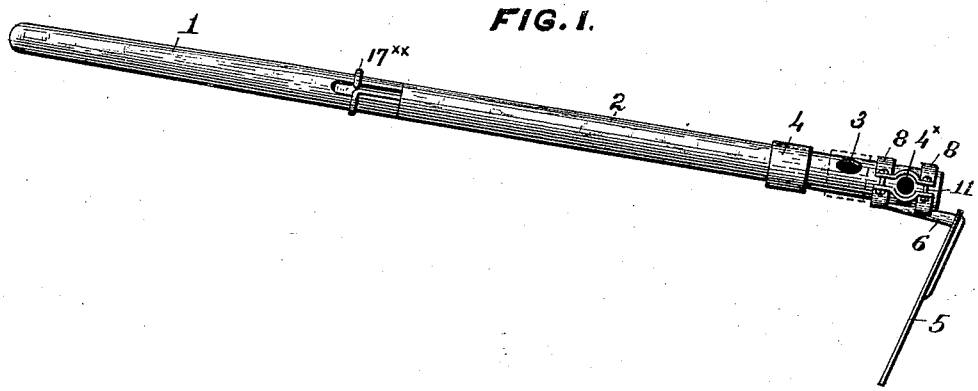
Figure 2:
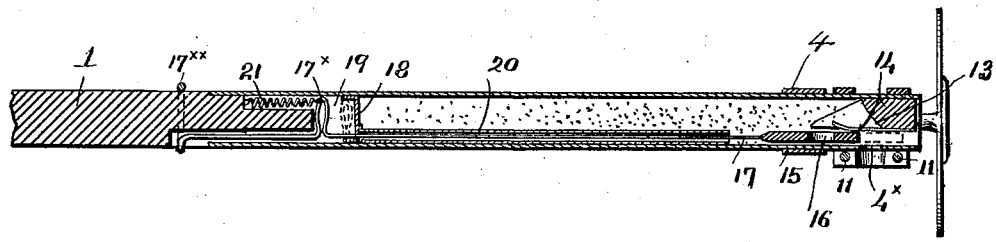
Figure 3:
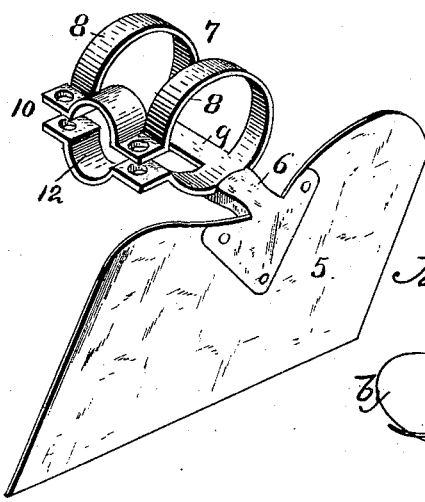

To attain the desired objects the invention consists of a combined hoe and planter embodying novel features of construction and combination of parts which will be fully understood from the following description and drawings, in which Figure 1 represents a side elevation of a hoe and planter constructed according to my invention, Fig. 2 represents a horizontal sectional view thereof and Fig. 3 represents an enlarged perspective view of the ferrule having the nozzle or chute and the shank and hoe.

Referring by numerals to the drawings in which similar numerals denote corresponding parts in the three views, the numeral 1 designates the upper and wooden section of the handle or staff and the numeral 2 designates the lower and metal section of the handle, both of which are the proper length so that when they are connected they will make a strong and reliable handle. The lower metal section is hollow and made of sheet metal and is provided on the upper side with the filling opening 3 to receive the corn, which opening is opened and closed by the sliding cover 4 in the form of a band encircling the tube and the tube is further provided near the end with a discharge opening $4^x$ through which the corn is discharged for planting, as will be understood.

To the hoe blade 5 is secured the shank 6 which is formed on the ferrule 7 consisting of the two rings 8, connected by the bar 9 and having the lipped portions 10 to receive the clamping or binding nuts and bolts 11 and the curved portions forming the guide or chute 12 for directing the corn from the discharge opening 4, said chute being in line with the discharge opening as clearly shown in Fig. 2.

In the open end of the tube or hollow metal section 2 is placed the block or plug 13, to which is secured the spring plate 14, which bears down on the slide 15 to keep said slide always in the proper place or to guide the same.

The slide is provided with an opening 16 adapted to receive the corn from the tube and carry it by means of the rod 17 to the discharge opening $4^x$, and said rod passes through a cap-plate 18 and into a cavity 19 in the said wooden section, and is provided with an arm, bend or lug $17^x$ and a ring $17^{xx}$ at the upper end by means of which the rod is moved up and down.

In order to prevent the corn from contacting with the rod and hindering the operation thereof I provide a tube 20 which surrounds the rod for almost its entire length and I attach to the arm, bend or lug $17^x$ of the rod the spring 21 which is arranged in a cavity of the wooden section and serves to return the rod to its normal position after it has been moved to drop the corn, as is evident.

The operation of my improved hoe and planter will be readily understood from the drawings and description and I would state that the metal tube is filled with corn or grain as desired which deposits the proper amount in the opening of the slide, the hoe blade is used to make the furrow or opening to receive the corn and the rod is pushed down bringing the opening of the slide in line with the discharge opening and discharging the corn therethrough and the chute or nozzle guides the corn to the furrow and thus the hoeing and planting are effected in a perfect manner and the rod is returned by the spring ready for another operation.

The cap plate serves to guide the rod and limits the movement thereof as the arm, bend or lug thereon contacts with said cap-plate and said plate also prevents the corn or grain from interfering with the spring and other parts which work in the wooden section.

It will be seen that I provide a combined hoe and planter which is very light in weight and can be used without fatiguing the operator and performs the functions of hoeing and planting in a perfect manner; which is composed of few parts and is not likely to get out of order owing to the hard usage, and which can be manufactured at a low price thus possessing all the features of merit to render the device useful and practical.

I claim as my invention;

1. In a combined hoe and planter, the combination of a staff or handle made of a solid and hollow section, said hollow section having a discharge opening, a hoe having a ferrule provided with a guide or nozzle for directing the corn from the discharge opening and a reciprocating slide having an opening adapted to receive and carry the corn or grain to the discharge opening, substantially as described.

2. In a combined hoe and planter, the combination of a wooden section and a hollow sheet metal section having a filling opening and discharge opening, a sliding cover for the filling opening, a hoe having a ferrule provided with a guide or nozzle for directing the corn or grain from the discharge opening of the tube, a slide in the tube having an opening, a rod connected to the slide for causing the opening thereof to coincide with the discharge opening, and a spring connected to said rod for returning it to its normal position, for the purpose described.

3. In a combined hoe and planter, the combination of the handle composed of the wooden section and the hollow sheet metal section having a discharge opening, a block or plug fitting in the end of said hollow section, a spring plate secured to said block, a slide arranged in said hollow section and having an opening, a hoe connected to the section and having a ferrule provided with a guide or nozzle, a rod connected to the slide and having a bend, arm or lug, a cap plate through which the rod passes and which limits the movement of the rod, a spring connected to the said lug, and a tube surrounding the rod, all as and for the purpose described.

4. In a combined hoe and planter, the combination of the staff or handle composed of the wooden and sheet metal section having a discharge opening, the hoe having the ferrule provided with a nozzle or guide for directing the corn from the discharge opening, and a spring controlled slide having an opening adapted to coincide with the said discharge opening, substantially as described.

5. In a combined hoe and planter, the combination of the hollow metal section, the rod movable therein, and the tube inclosing said rod, substantially as and for the purpose described.

6. In a combined hoe and planter, the combination of the handle consisting of the solid and hollow sections, the rod movable therein and having the upper end bent to encircle the handle and form a handle for said rod.

7. In a combined hoe and planter, a hoe blade, a shank thereon, and a ferrule on the shank having a discharge opening.

In testimony whereof I affix my signature in presence of two witnesses.

JAMES R. AYERS.

Witnesses:
HENRY E. COOPER,
WM. N. MOORE.